United States Patent
Hayashi

(10) Patent No.: US 7,934,745 B2
(45) Date of Patent: May 3, 2011

(54) AIRBAG COVER, INSTRUMENT PANEL, AIRBAG DEVICE, AND AIRBAG STORAGE

(75) Inventor: Shinji Hayashi, Tokyo (JP)

(73) Assignee: Takata Corporation, Tokyo (JP)

( * ) Notice: Subject to any disclaimer, the term of this patent is extended or adjusted under 35 U.S.C. 154(b) by 181 days.

(21) Appl. No.: 12/355,542

(22) Filed: Jan. 16, 2009

(65) Prior Publication Data

US 2009/0184496 A1     Jul. 23, 2009

(30) Foreign Application Priority Data

Jan. 18, 2008 (JP) .................................. 2008-009805

(51) Int. Cl.
*B60R 21/205* (2011.01)

(52) U.S. Cl. ..................................... 280/728.3; 280/732

(58) Field of Classification Search ............... 280/728.3, 280/732

See application file for complete search history.

(56) References Cited

U.S. PATENT DOCUMENTS

| | | | |
|---|---|---|---|
| 6,929,280 B2 * | 8/2005 | Yasuda et al. ............... | 280/728.2 |
| 7,007,970 B2 * | 3/2006 | Yasuda et al. ............... | 280/728.3 |
| 7,093,849 B2 * | 8/2006 | Nishijima et al. .......... | 280/728.3 |
| 7,229,095 B2 * | 6/2007 | Nishijima et al. ............ | 280/732 |
| 7,234,726 B2 * | 6/2007 | Trevino et al. .............. | 280/728.3 |
| 7,354,061 B2 * | 4/2008 | Yasuda et al. ............... | 280/728.3 |
| 7,484,752 B2 * | 2/2009 | Yasuda et al. ............... | 280/728.3 |
| 7,556,285 B1 * | 7/2009 | Hayashi ...................... | 280/728.3 |
| 7,665,758 B2 * | 2/2010 | Hayashi ...................... | 280/728.3 |
| 7,770,915 B2 * | 8/2010 | Nishijima et al. .......... | 280/728.3 |
| 7,784,820 B2 * | 8/2010 | Mazzocchi et al. ........ | 280/728.3 |
| 2006/0202447 A1 * | 9/2006 | Sawada ....................... | 280/728.3 |
| 2007/0029763 A1 * | 2/2007 | Hayashi ...................... | 280/728.3 |
| 2008/0030009 A1 * | 2/2008 | Hayashi ...................... | 280/728.3 |
| 2010/0078920 A1 * | 4/2010 | Terai et al. .................. | 280/728.3 |

FOREIGN PATENT DOCUMENTS

| | | |
|---|---|---|
| EP | 1 388 467 A1 | 2/2004 |
| EP | 1 728 691 A2 | 12/2006 |
| JP | 2001-294114 | 10/2001 |
| JP | 2004-001635 | 1/2004 |
| JP | 2004-009708 | 1/2004 |
| JP | 2004-122860 | 4/2004 |
| JP | 2004-161182 | 6/2004 |
| JP | 2004-175303 | 6/2004 |
| JP | 2004-175305 | 6/2004 |
| JP | 2004-345145 | 12/2004 |

* cited by examiner

*Primary Examiner* — Ruth Ilan
*Assistant Examiner* — Drew Brown
(74) *Attorney, Agent, or Firm* — Fitch Even Tabin & Flannery

(57) ABSTRACT

An airbag cover to be mounted to correspond to a passenger seat of a vehicle is disclosed that provides an effective technique to ensure the strength, during opening, of an opened end in the part opening toward an occupant pushed by an inflating and developing airbag. In an airbag cover according to one form of the present invention, a part opening toward an occupant pushed by an inflating and developing airbag is configured such that in regard to a spaced distance between an opened end of a flap part and a plurality of bonding ribs, each of the spaced distances in the regions of corners of the opened end is smaller than the spaced distance in the region of the hinge part.

7 Claims, 5 Drawing Sheets

VEHICLE BACK DIRECTION ←

VEHICLE FRONT DIRECTION →

VEHICLE BACK DIRECTION ←

VEHICLE FRONT DIRECTION →

AIRBAG COVER, INSTRUMENT PANEL, AIRBAG DEVICE, AND AIRBAG STORAGE

FIELD OF THE INVENTION

The present invention relates to an architectural technique of an airbag cover to be mounted to correspond to a passenger seat of a vehicle.

BACKGROUND OF THE INVENTION

For example, in Japanese Unexamined Patent Application Publication No. 2004-1635, an example of a conventional passenger airbag device is disclosed. In this passenger airbag device, an airbag cover for covering a passenger airbag is provided with tear lines formed thereon for cleaving the airbag cover. At a vehicle collision, the airbag cover is cleaved along the tear lines and a development door is developed so as to allow the passenger airbag to inflate and develop outside the airbag cover.

SUMMARY OF THE INVENTION

In order to solve the objects described above, the following embodiments are described.

An airbag cover according to the present invention is to be mounted to correspond to a passenger seat of a vehicle, and includes at least an airbag accommodation part, a top board part, a tear line, a development part, and a plurality of bonding ribs.

The airbag accommodation part is configured to accommodate an airbag that develops and inflates at an accident toward an occupant sitting in the passenger seat. It is preferable that the airbag be accommodated in the airbag accommodation part in a state folded in a predetermined form, such as roll folding, bellows folding, and mechanical folding, in advance. The "accommodation" of the airbag with the airbag accommodation part herein widely includes forms that directly or indirectly surround the entire or part of the airbag. The top board part is configured to extend between the airbag accommodation part and the occupant to cover the airbag accommodated within the airbag accommodation part. The tear line is configured to be a tear line (a cleavage proposed line) formed on the top board part for cleaving the airbag cover. The tear line is a region thinned in the thickness direction of the top board part typically by ultrasonic or laser machining, and is also referred to "a thin wall part" or "a reduced wall part". It is preferable that the tear line coincide with part of or the whole cleaved line actually cleaved along the tear line. That is, the tear line may be sufficient as long as it has a function to form a cleaved line such that the airbag cover creates a desired cleavage form, so that the cleaved line may also be formed beyond the tear line. The development part is configured to be a region zoned by the tear line on the top board part.

The flap part is configured to be a square-shaped part that extends between the development part and the airbag accommodated in the airbag accommodation part to oppose the development part and is capable of opening while rotating about the hinge part as a rotational fulcrum. The plurality of the bonding ribs is configured to be erected from the surface, opposing the development part, of the flap part toward the development part. The flap part is integrally vibration-bonded to the top board part at ends of the plurality of the bonding ribs, and is configured such that an opened end is pushed by the developing and inflating airbag from the side of the airbag accommodation part to open toward the occupant about the hinge part as the rotational fulcrum, together with the top board part cleaved along the tear line. In regard to the vibration welding, the development part and the flap part are relatively vibrated in a vibrating direction along the extending surface of the flap part (or a direction intersecting to the erecting direction of the ribs), so that the development part and the flap part are bonded together via the plurality of the bonding ribs.

In such a configuration, the flap part opened together with the development part of the top board part is assumed to collide with surfaces of the instrument panel and the top board part, so that the securing of the strength of the opened end during the opening is required. It has been known that the region of the opened end of the square-shaped flap part is opened while being deflected by the pressure load received from the developing and inflating airbag. In such a case, it is assumed that in every region of the opened end of the square-shaped flap part, corners particularly intensely collide with the surfaces of the instrument panel and the top board part. On the other hand, since the region of the hinge part is that of the rotational fulcrum, the region cannot collide with the surfaces of the instrument panel and the top board part during the opening of the flap part, so that the smooth opening function not hindering the developing and inflating operation of the airbag is more required rather than the securing of the strength during the opening.

Then, in the airbag cover according to the present invention, furthermore in regard to a spaced distance between the opened end of the flap part and the plurality of the ribs, the flap part is configured such that the spaced distance in the region of a corner of the opened end is smaller than that in the region of the hinge part. Namely, in the regions of the corners of the opened end, the rib arranged on the outermost side among the plurality of the ribs is positioned such that its outer wall face is shifted toward the opened end (the edge portion) as closely as possible. The configuration of the flap part may adopt a first configuration in that the respective spaced distances in the regions of both the corners of the opened end are established to be smaller than that in the region of the hinge part as well as to be the same as or smaller than the respective spaced distances in the regions of the opened end other than the corner; a second configuration in that the spaced distance in the region of one corner of the opened end is established to be smaller than that in the region of the hinge part as well as to be the same as or smaller than the respective spaced distances in the regions of the opened end other than the corner; and a third configuration in that the spaced distances in the regions of both the corners of the opened end are different from each other and any of them is established to be smaller than that in the region of the hinge part as well as to be the same as or smaller than the respective spaced distances in the regions of the opened end other than the corner.

According to such a configuration of the airbag cover of the present invention, by establishing the region outside the bonding rib to be narrower in the regions of the corners of the opened end in the flap part, the strength (rigidity and bonding strength) of the opened end during the opening can be secured. Furthermore, it is preferable that the same spaced distance as the respective spaced distances in the regions of the corners be established over the entire regions of the opened end. Thereby, the strength of the opened end during the opening can be secured over the entire regions of the opened end. On the other hand, in the region of the hinge part, by ensuring a predetermined spaced distance between the opened end and the bonding rib, the smooth opening function of the flap part can be improved. It is preferable that the spaced distance in the region of the corner of the opened end be established to be in the range, in which the rib approaches the opened end (the edge portion) as closely as possible without overflowing outside from the opened end of the flap part. Thereby, the strength of the opened end of the flap part during the opening can be further improved.

In an airbag cover according to another embodiment of the present invention, it is preferable that the flap part be configured such that the spaced distance in the region of the corner of the opened end is further smaller than the respective spaced distances in the regions of the opened end other than the corner. That is, the flap part of the airbag cover is configured such that the spaced distance in the region of the corner of the opened end is smaller than that in the region of the hinge part as well as is smaller than the respective spaced distances in the regions of the opened end other than the corner. According to such a configuration, a structure of the airbag cover can be achieved in that the strength during the opening is made a difference between the region of the corner and the regions other than the corner in every region of the opened end.

The instrument panel according to the present invention is a panel bilaterally and longitudinally extending in front of front seats of a vehicle and is configured to have the integrally provided airbag cover configured as above. According to such a configuration, there is provided an integral type airbag cover/instrument panel capable of improving the smooth opening function of the flap part while ensuring the strength of the opened end of the flap part during the opening.

The "instrument panel" herein is a panel bilaterally and longitudinally extending in front of driver and passenger seats in a vehicle cabin, that is, a panel body (referred also to "a dash board") bilaterally (in the vehicle width direction) extending between a windshield and a driver/an occupant. The "instrument panel" is defined as a whole panel including not only a panel for instruments, such as a speed meter and a tachometer, but also a part where the passenger airbag module is attached and a grove box arranged in front of the passenger seat for storing small articles. Furthermore, "the instrument panel" may also include panels storing a supply opening of a car air conditioner and a car stereo system.

The airbag device according to the present invention includes at least an airbag, a gas supply unit, and an airbag cover. The airbag is configured to develop and inflate at an accident toward an occupant sitting in the passenger seat so as to restrain the occupant. The gas supply unit is configured to supply gas for development and inflation to the airbag. The airbag cover is an airbag cover that interposes between the airbag and the occupant, and is configured as the above-described airbag cover. According to such a configuration, an airbag device having an airbag cover in that the airbag cover is capable of improving the smooth opening function of the flap part while ensuring the strength of the opened end of the flap part during the opening.

In an airbag cover to be mounted to correspond to a passenger seat of a vehicle, the airbag storage according to the present invention is configured to store an airbag that develops and inflates at an accident toward an occupant sitting in the passenger seat. The "storing" of the airbag with the airbag storage herein widely includes forms that directly or indirectly surround the entire or part of the airbag. The airbag storage includes at least a flap part and a plurality of bonding ribs. The flap part is configured to be a square-shaped region that extends to oppose a top board part, which extends between the airbag storage and the occupant to cover the airbag, and is capable of opening while rotating about a hinge part as a rotational fulcrum. The plurality of the bonding ribs are configured to be regions erected from the surface, opposing the top board part, of the flap part toward the top board part. The flap part is also integrally vibration-bonded to the top board part at ends of the plurality of the bonding ribs, and is configured such that an opened end is pushed by the developing and inflating airbag to open toward the occupant about the hinge part as the rotational fulcrum, together with the top board part. Furthermore, in regard to a spaced distance between the opened end of the flap part and the plurality of the ribs, the spaced distance in the region of a corner of the opened end is smaller than that in the region of the hinge part. According to such a configuration, the airbag storage capable of improving the smooth opening performance of the flap part while ensuring the strength of the opened end of the flap part during opening can be provided.

In the airbag storage according to another embodiment, it is preferable that the flap part be configured such that the spaced distance in the region of the corner of the opened end is further smaller than the respective spaced distances in the regions of the opened end other than the corner. Namely, the flap part of the airbag storage is configured such that the spaced distance in the region of the corner of the opened end is smaller than that in the region of the hinge part as well as is smaller than the respective spaced distances in the regions of the opened end other than the corner. According to such a configuration, a structure of the airbag storage can be achieved in that the strength during the opening is made a difference between the region of the corner and the regions other than the corner in every region of the opened end.

As described above, according to the present invention, in the airbag cover to be mounted to correspond to a passenger seat of a vehicle, especially in the configuration of the part opening toward an occupant pushed by the developing and inflating airbag, by adopting the configuration that in regard to a spaced distance between the opened end of the flap part and the plurality of the bonding ribs, the spaced distance in the region of a corner of the opened end is smaller than that in the region of the hinge part, the securing of the strength of the opened end of the flap part during the opening has been enabled.

An airbag device according to an embodiment of "an airbag device" of the present invention will be described below with reference to the drawings. Although not shown, the airbag device is constructed as a passenger airbag device mounted to correspond to a passenger seat of a vehicle for restraining an occupant by a developing and inflating airbag (a below-mentioned airbag) at a vehicle accident.

DETAILED DESCRIPTION OF THE PREFERRED EMBODIMENTS

Figure 1:
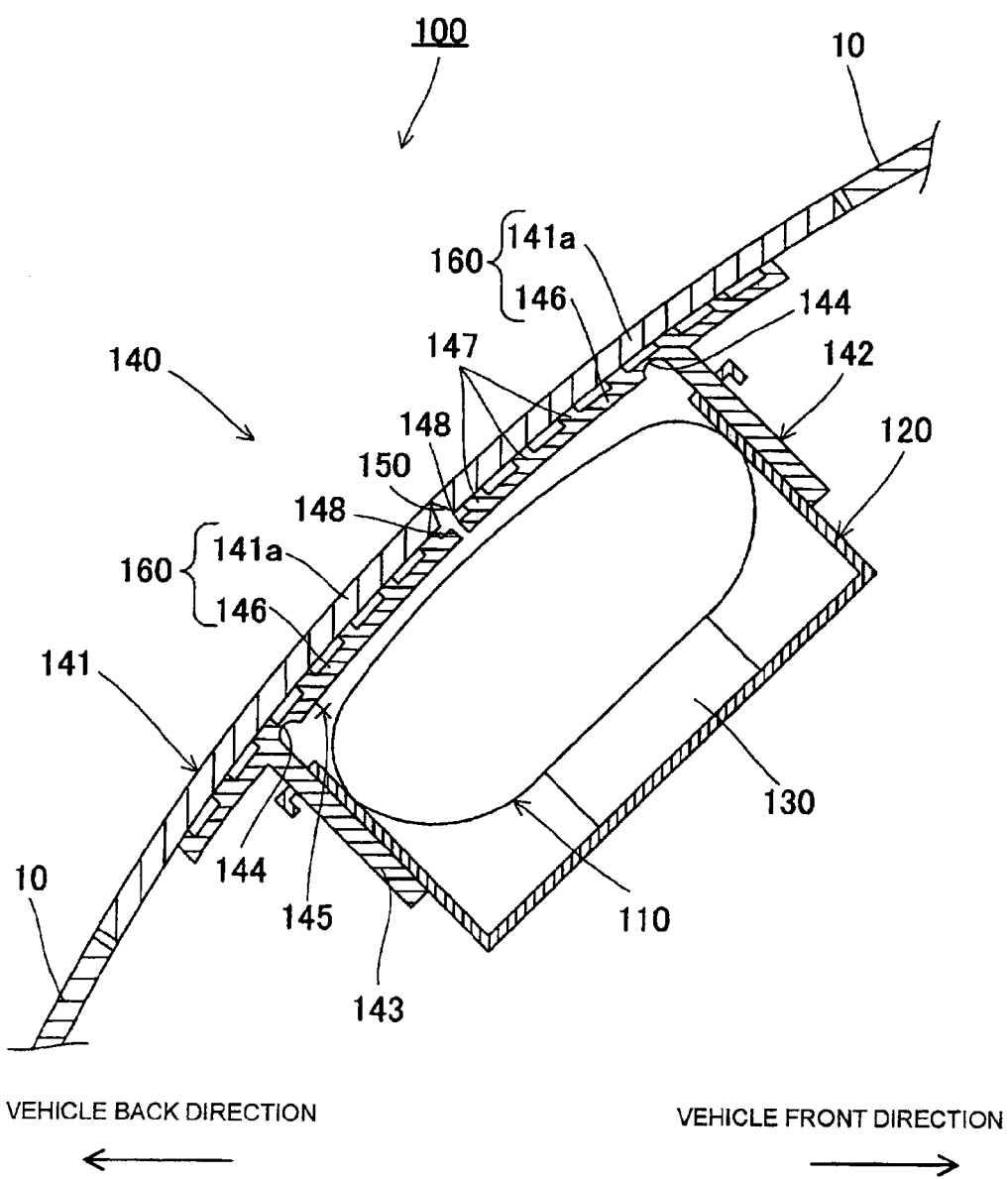
FIG. 1 is a drawing showing a sectional structure of an airbag device according to an embodiment.
Figure 2:
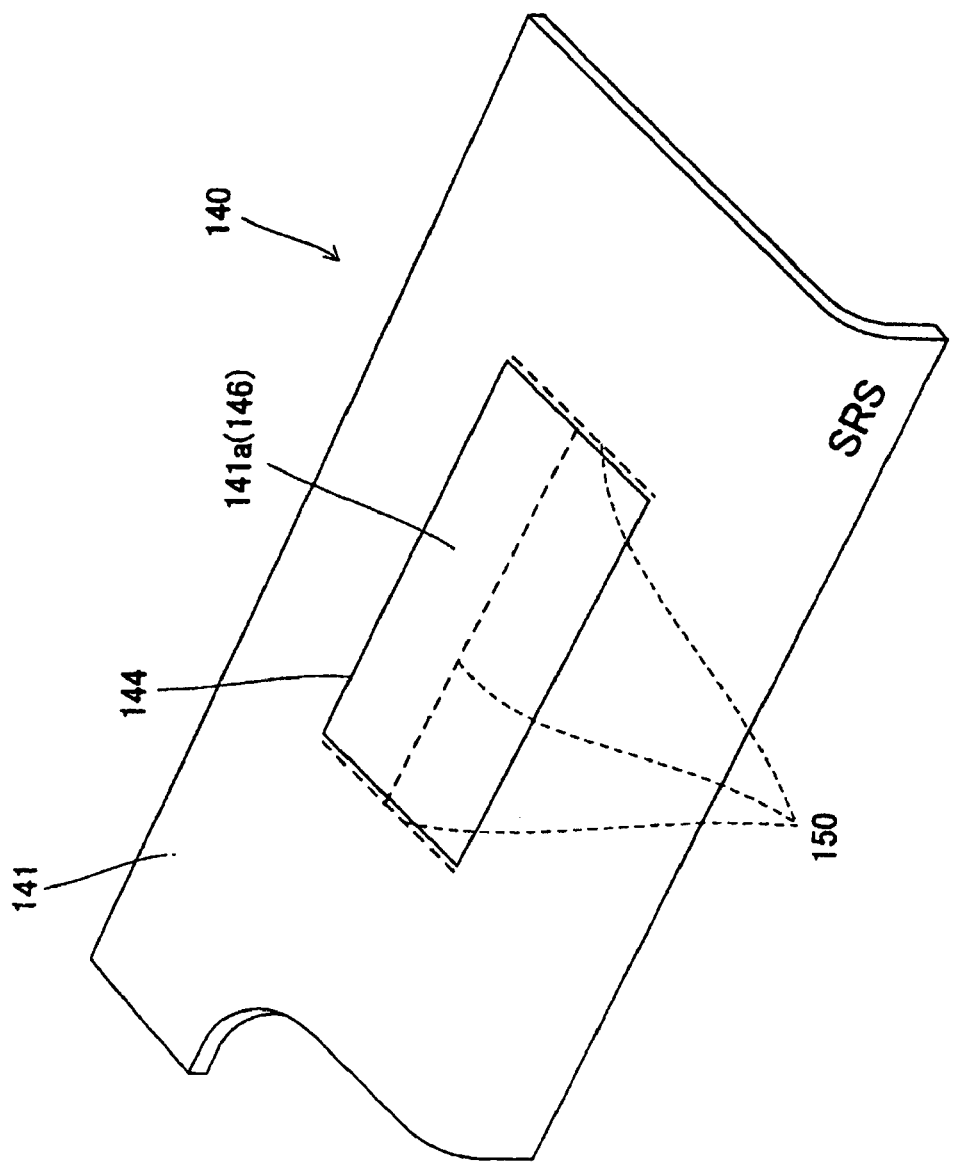
FIG. 2 is a perspective view of an airbag cover shown in FIG. 1 and viewed from an occupant.

The overall configuration of the airbag device 100 is referred to FIGS. 1 and 2. FIG. 1 shows a sectional structure of the airbag device 100 according to the embodiment; and FIG. 2 is a perspective view of an airbag cover 140 shown in FIG. 1 and viewed from an occupant. As shown in FIG. 1, the airbag device 100 mainly includes the airbag 110, a retainer 120, an inflator 130, and an airbag cover 140. The airbag device 100 is mountable on a vehicle in an integrally modularized state, together with every component including the airbag 110, and is also called as "an airbag module".

The airbag 110, at a vehicle accident, has a function to protrude onto an occupant restraint region of a passenger seat to be developed and inflated for restraining an occupant sitting in the passenger seat. This airbag corresponds to "an airbag" according to the present invention. The retainer 120 serves as an airbag accommodation part or an airbag storage for accommodating the airbag 110 folded in a predetermined form (roll folding, bellows folding, and mechanical folding) in advance. The retainer 120 is attached to the back side of the airbag cover 140, i.e., on the surface of the airbag cover 140 opposite to the occupant. The inflator 130, at a vehicle accident, serves as gas supplying means for supplying gas to the airbag 110 by generating the gas for development and inflation. This inflator 130 constitutes "a gas supply unit" according to the present invention.

The airbag cover 140 is arranged to link with an instrument panel 10 of the vehicle and to serve as a covering body for covering the airbag 110 stored within the retainer 120. The airbag cover 140 includes at least a top board part 141, a frame body 140, tear lines 150, and a pair of development doors 160 and 160. This airbag cover 140 corresponds to "an airbag cover" according to the present invention. The airbag cover 140 is configured to directly or indirectly surround the entire or part of the airbag 110, and constitutes "an airbag accommodation part" or "an airbag storage" according to the present invention together with the retainer 120.

The instrument panel 10 is a panel bilaterally and longitudinally extending in front of front seats of the vehicle, and has a structure having the airbag cover 140 integrated by vibration welding. The instrument panel 10 is a panel body (referred also to "a dash board") bilaterally (in the vehicle width direction) extending in front of a driver seat and a passenger seat in a vehicle cabin, i.e., between a windshield and a driver/an occupant. The instrument panel 10 is defined as a whole panel including not only a panel for instruments, such as a speed meter and a tachometer, but also a part where the airbag 110 according to the embodiment is attached and a glove box arranged in front of the passenger seat for storing small articles. Furthermore, the instrument panel 10 may also include panels storing a supply opening of a car air conditioner and a car stereo system. The instrument panel 10 corresponds to "an instrument panel" according to the present invention.

The top board part 141 is a board portion extending between the retainer 120 and an occupant along a surface opposing the occupant, and has a function to cover the airbag 110 stored in the retainer 120. The top board part 141 is formed of a resin material such as PP (polypropylene) and TPO (olefinic elastomer). The surface of the top board part 141 may also be covered with a resin skin. This top board part 141 corresponds to "a top board part" according to the present invention.

On the rear face of the top board part 141, i.e., on the surface opposite to the occupant, the tear line 150 is formed as a cleavage proposed line for cleaving the airbag cover. The tear line 150 is a region thinned in the thickness direction of the top board part 141 typically by ultrasonic or laser machining, and is also referred to "a thin wall part" or "a reduced wall part". This tear line 150 corresponds to "a tear line for cleaving an airbag cover" according to the present invention.

Development parts 141a and 141a zoned by the tear lines 150 are developed (opened) together with flap parts 146 and 146 (below mentioned) by the cleavage along the tear line 150 during developing and inflating of the airbag 110. The tear line 150 coincides with part or the whole of a cleaved line actually cleaved along the tear line 150. That is, the tear line 150 may be sufficient as long as it has a function to form a cleaved line such that the airbag cover 140 creates a desired cleavage form, so that the cleaved line may also be formed beyond the tear line 150. These development parts 141a and 141a correspond to "development parts" according to the present invention.

On the rear face of the top board part 141, the frame body 142 is bonded. The frame body 142 includes a rectangular cylindrical part 143 fixed to the retainer 120 and flap parts 146 capable of opening an upper opening 145 of the cylindrical part 143 or being capable of opening/shutting about hinge parts 144 as rotational fulcrums, respectively. To the cylindrical part 143 of the frame body 142, the retainer 120 configured as above is attached. As shown in FIG. 2, the flap part 146 has a square shape substantially coinciding with the development part 141a. This flap part 146 corresponds to "a flap part" according to the present invention, and the hinge part 144 as the rotational fulcrum of the flap part 146 corresponds to "a rotating part" according to the present invention.

In regard to the bonding between the top board part 141 and the frame body 142, they are integrally bonded together by known vibration welding using a plurality of bonding ribs 147 erected from the upper surface (the surface opposing the top board part 141) of the frame body 142 in the thickness direction of the top board part 141. Typically, in the vibration welding operation, the development part 141a and the flap part 146 are relatively vibrated in a vibrating direction along the extending surface of the flap part 146 (or a direction intersecting to the erecting direction of the rib 147), so that the development part 141a and the flap part 146 are bonded together via the plurality of the bonding ribs 147. At this time, by establishing the vibration such that the longitudinal direction of the plurality of the bonding ribs 147 agrees with the vibrating direction, the vibration welding efficiency can be improved.

Figure 3:
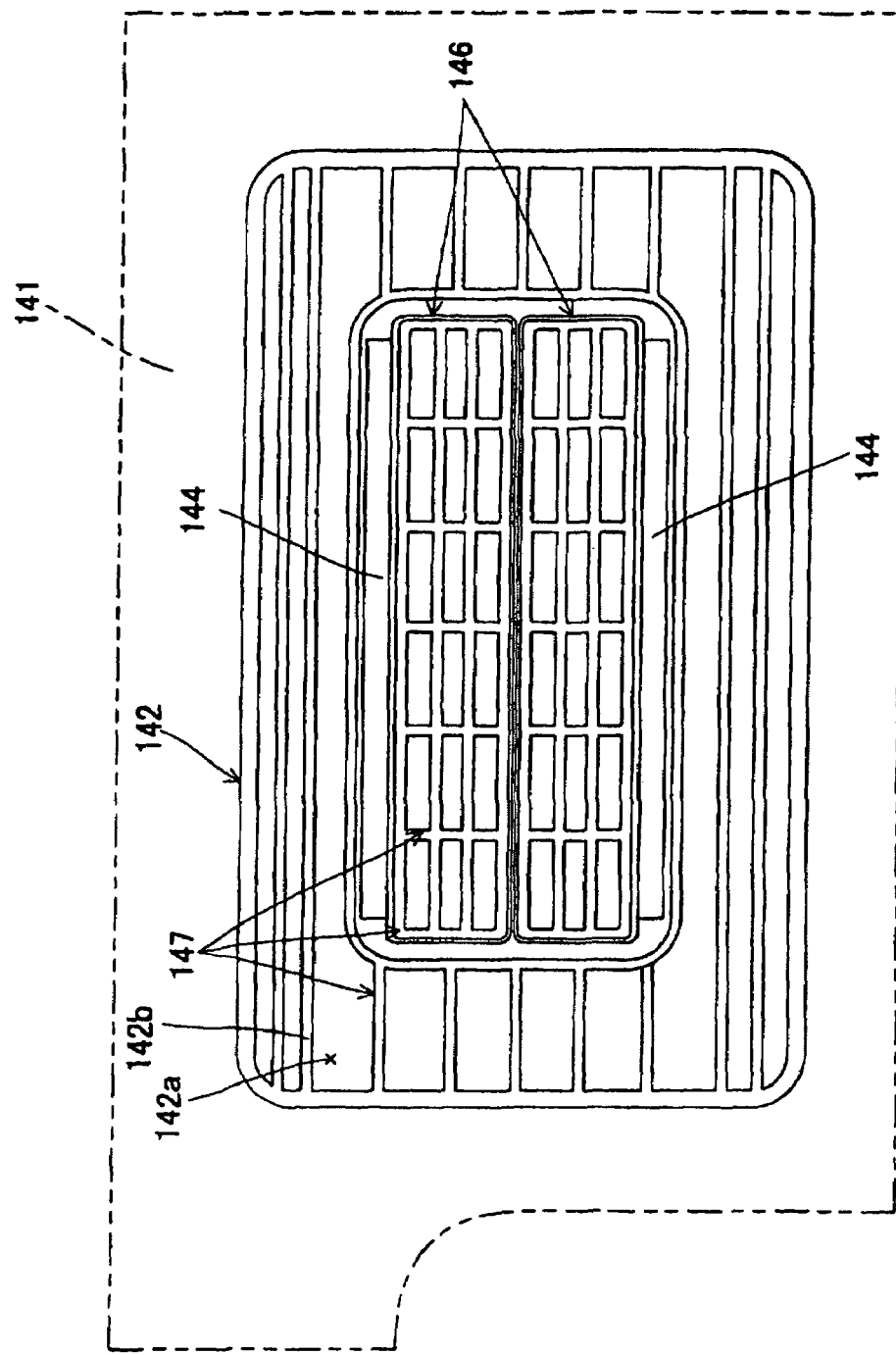
FIG. 3 is a plan view of a frame body according to the embodiment and viewed from above.
Figure 4:
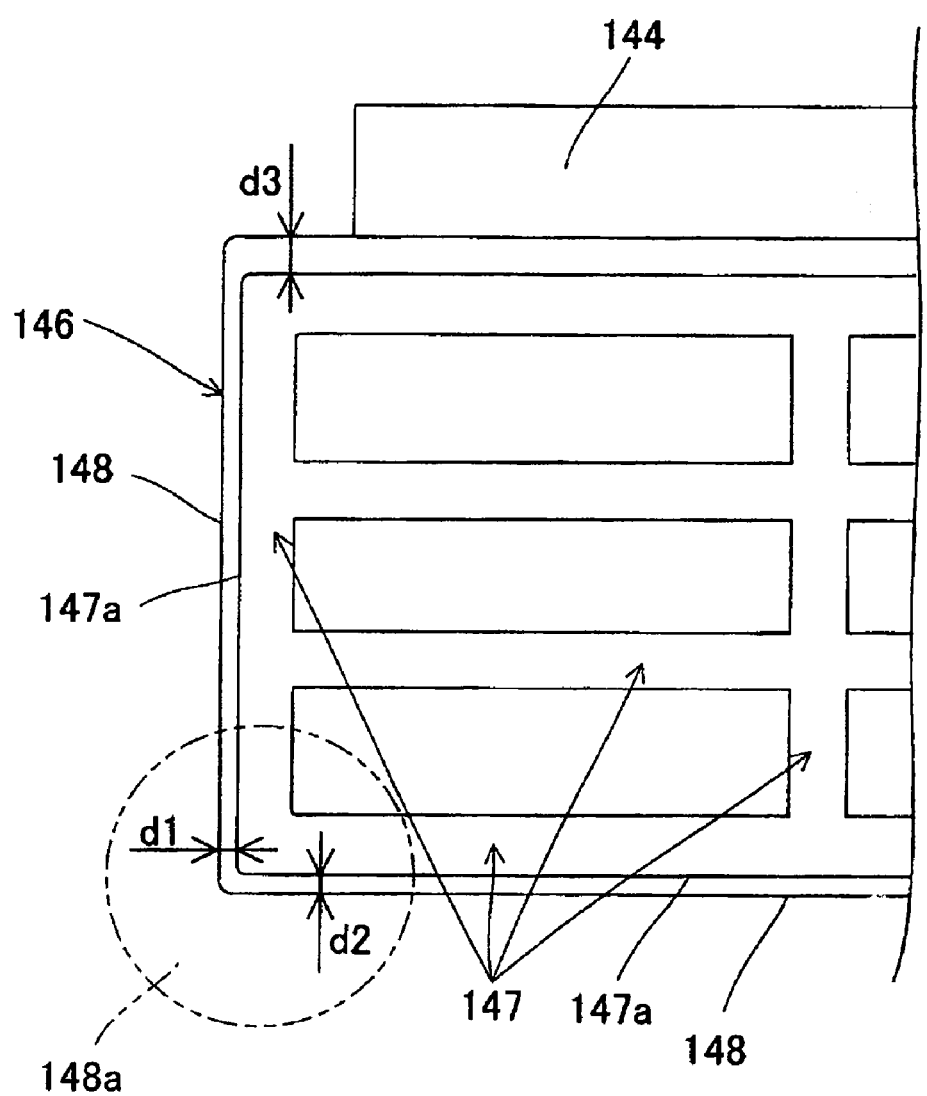
FIG. 4 is a partial enlarged view of the frame body shown in FIG. 3.

The configuration of the upper surface of the frame body 142 is referred to FIGS. 3 and 4. FIG. 3 is a plan view of the frame body 142 according to the embodiment, viewed from above; and FIG. 4 is a partial enlarged view of the frame body 142 shown in FIG. 3.

As shown in FIG. 3, the upper surface of the frame body 142 opposing the development parts 141a and 141a is provided with a plurality of the bonding ribs 147 erected from the bottom of the upper surface 142a toward the top of the upper surface 142b. The plurality of the bonding ribs 147 extend in the lateral direction (the horizontal direction in FIG. 3) while extend in the longitudinal direction (the vertical direction in FIG. 3). In the frame body 142, especially on the upper surface of the flap part 146, the bonding ribs 147 are formed in the lateral and longitudinal directions in a lattice arrangement. This rib 147 corresponds to "a bonding rib" according to the present invention.

By the way, each flap part 146 configured as above is opened about the hinge part 144 as a rotational fulcrum together with each development part 141a cleaved along the tear lines 150 such that an opened end 148 is pushed by the developing and inflating airbag 110 from the side of the retainer 120 to open toward the occupant. In such a configuration, the flap part 146 opened together with each development part 141a is assumed to collide with surfaces of the instrument panel 10 and the top board part 141, so that the securing of the strength of the opened end 148 during the opening is required. It has been known that the region of the opened end 148 of each square-shaped flap part 146 is opened while being deflected by the pressure load received from the developing and inflating airbag 110. In such a case, it is assumed that in every region of the opened end 148 of the square flap part 146, both corners 148a and 148a particularly intensely collide with the surfaces of the instrument panel 10 and the top board part 141. On the other hand, since the region of the hinge part 144 is that of the rotational fulcrum, the region cannot collide with the surfaces of the instrument panel 10 and the top board part 141 during the opening of the flap part 146, so that the smooth opening function not hindering the developing and inflating operation of the airbag 110 is more required rather than the securing of the strength during the opening.

Then, as referred to FIG. 4, the flap part 146 according to the embodiment is configured such that in regard to the spaced distance between the opened end (referred also to an edge portion) 148 of the flap part 146 and a plurality of the ribs 147, each of the spaced distances d1 and d2 in the regions of both the corners 148a and 148a of the opened end 148 is smaller than the spaced distance d3 in the region of the hinge part 144. Namely, in the regions of both the corners 148a and 148a of the opened end 148, the rib 147 arranged on the outermost side among the plurality of the ribs 147 is positioned such that its outer wall face 147a is shifted toward the opened end 148 as closely as possible. In FIG. 4, one corner 148a of the opened end 148 is only shown for the convenience sake. These opened end 148 and corner 148a correspond to "an opened end" and "a corner" according to the present invention, respectively.

According to such a configuration, the securing of the strength (rigidity and bonding strength) of the opened end 148 during the opening is enabled by configuring the region outer than the bonding rib 147 to be narrower in the regions of both the corners 148a and 148a of the opened end 148. Furthermore, it is preferable that the same spaced distance as in the regions of both the corners 148a and 148a be established over the entire regions of the opened end 148. Thereby, the securing of the strength of the opened end 148 during the opening is possible over the entire regions of the opened end 148. On the other hand, in the region of the hinge part 144, by ensuring a predetermined spaced distance between the opened end 148 and the rib 147, the smooth opening performance of the flap part 146 can be improved. It is preferable that on the basis of the deformation form of the rib 147 during the vibration welding, the spaced distances d1 and d2 in the regions of both the corners 148a and 148a be established to be in the range, in which the rib 147 approaches the opened end 148 as closely as possible without overflowing outside from the opened end 148 of the flap part 146. Thereby, the strength of the opened end 148 of the flap part 146 during the opening can be further improved.

Figure 5:
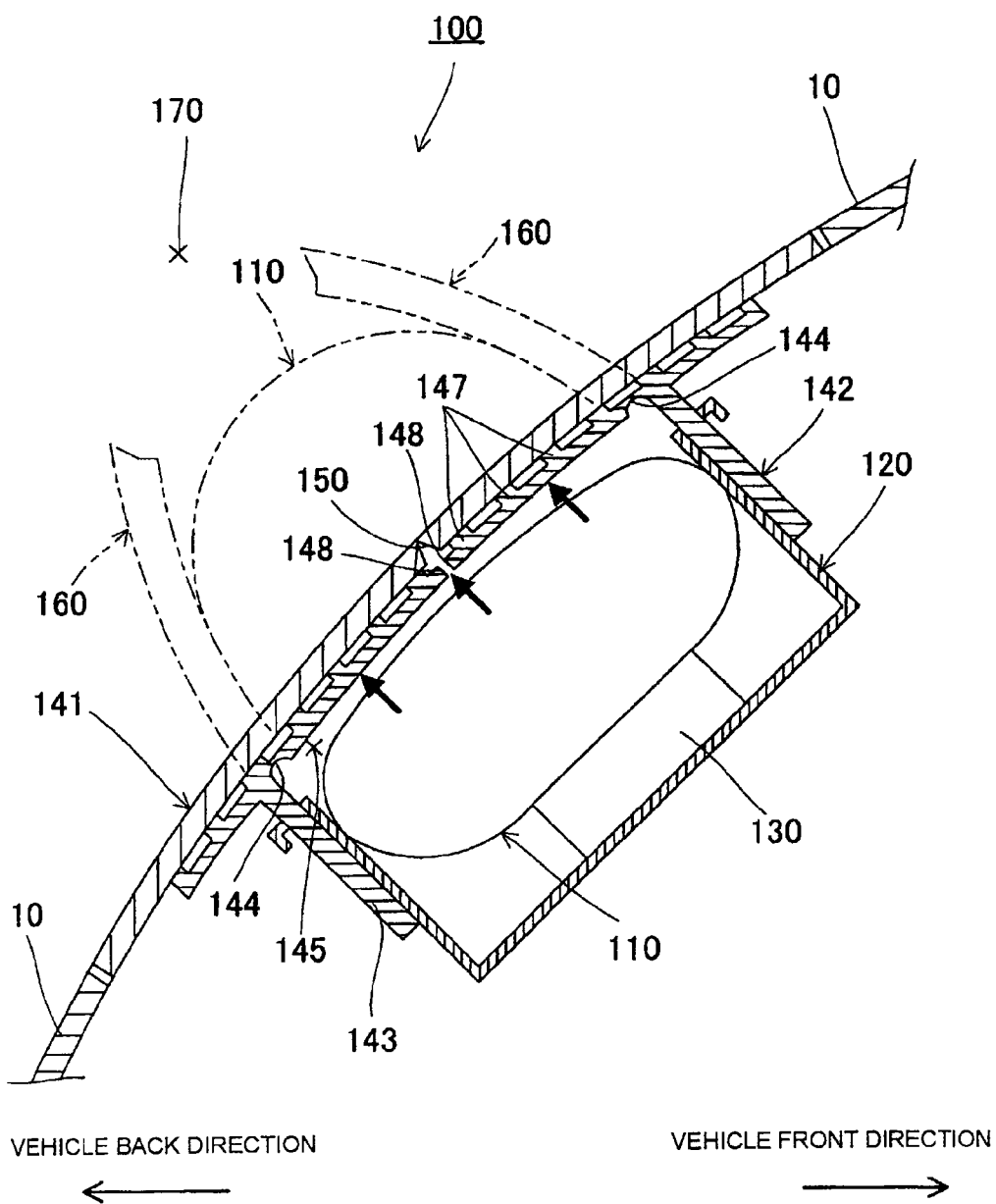
FIG. 5 is a drawing showing a sectional structure of the airbag device during opening of an airbag cover according to the embodiment.

The operation of the airbag device 100 configured as above is referred to FIG. 5. FIG. 5 shows a sectional structure of the airbag device 100 when the airbag cover 140 according to the embodiment is opened.

At a vehicle accident, when the vehicle accident or the collision forecast is detected by a sensor (not shown) mounted on the vehicle, the airbag device 100 is operated, and the inflating gas is supplied to the airbag 110 from the inflator 130. Thereby, the airbag 110 develops and inflates while protruding outside the retainer 120 in ARROW direction of FIG. 5. This direction substantially coincides with that toward an occupant restraint region 170, i.e., a region where an occupant exists. At this time, the flap parts 146 are pushed by the developing and inflating load of the airbag 110 so as to start developing toward the top board part 141 about the hinge parts 144. By the further developing and inflating operation of the airbag 110, the top board part 141 cleaves along the tear lines 150, and plate-like developing doors 160, each including the development part 141a and the flap part 146 that are bonded together, are integrally developed. Thus, the airbag 110, allowed to protrude outside the airbag cover 140 through the upper opening 145 by the developing operation of the developing doors 160, develops and inflates toward the occupant restraint region 170 with the resistance suppressed during protruding outside the airbag cover 140 so as to restrain the occupant at once. Thereby, the occupant restraining function at a vehicle accident can be improved.

As described above, according to the embodiment, it is possible to achieve the airbag cover 140 and the instrument panel 10 integrated with the airbag cover that are capable of improving the smooth opening performance of the flap part 146 while ensuring the strength of the opened end 148 of the flap part 146 during opening.

According to the embodiment, it is also possible to achieve the airbag device 100 having the airbag cover 140 capable of improving the smooth opening performance of the flap part 146 while ensuring the strength of the opened end 148 of the flap part 146 during opening.

The present invention is not limited to the embodiment described above and various modifications may be made. For example, the following embodiments making use of the above embodiment may also be carried out.

The configuration of the flap part 146 according to the embodiment can adopt a first configuration in that the respective spaced distances in the regions of both the corners 148a and 148a of the opened end 148 are established to be smaller than that in the region of the hinge part 144 as well as to be the same as or smaller than the respective spaced distances in the regions of the opened end 148 other than the corner 148a; a second configuration in that the spaced distance in the region of one corner 148a of the opened end 148 is established to be smaller than that in the region of the hinge part 144 as well as to be the same as or smaller than the respective spaced distances in the regions of the opened end 148 other than the corner 148a; and a third configuration in that the spaced distances in the regions of both the corners 148a and 148a of the opened end 148 are different from each other and any of them is established to be smaller than that in the region of the hinge part 144 as well as to be the same as or smaller than the respective spaced distances in the regions of the opened end 148 other than the corner 148a. In particular, when the third configuration is adopted, a structure can be achieved in that the strength during the opening is made a difference between the region of the corner 148a and the regions other than the corner 148a in every region of the opened end 148.

According to the embodiment, in the developing doors 160, only the flap part 146 has the plurality of the ribs 147; however, according to the present invention, the plurality of the ribs 147 can be provided in at least one of the development part 141a and the flap part 146. For example, the plurality of the ribs 147 may be provided only in the development part 141a or may be provided in both the development part 141a and the flap part 146.

According to the embodiment, a pair of the developing doors 160 open by receiving a developing and inflating load from the airbag 110; however, the number of the developing doors 160 may be appropriately changed if necessary. For example, single developing door or three developing doors may also be adopted.

What is claimed is:

1. An airbag cover for an instrument panel of a vehicle, the airbag cover comprising:
   an upper panel portion for being mounted adjacent the instrument panel to be generally aligned therewith;
   a pivotal lower door portion for extending over an airbag mounted therebelow;
   an elongate end edge of the pivotal door portion;
   an elongate hinge of the pivotal door portion generally extending parallel to the elongate end edge thereof; and
   opposite sides of the pivotal door portion extending between the elongate end edge and the elongate hinge;
   opposite corners of the pivotal door portion at junctures between the elongate end edge and the opposite sides;
   a plurality of ribs bonded between the upper panel portion and the pivotal door portion with the ribs including corner ribs adjacent to the corners and a hinge rib adjacent to the hinge;
   a first spacing between the corner ribs and corners that is narrower than a second spacing between the hinge rib and hinge so that the connection between the panel and door portions provided by the corner ribs adjacent the corners is more secure than the connection between the panel and door portions provided by the hinge rib adjacent the hinge.

2. The airbag cover of claim 1 wherein the corner ribs include side ribs that extend substantially parallel to the sides of the door portion and an end rib that extends substantially parallel to the elongate end edge of the door portion, and the first spacing comprises a side spacing between the side ribs and the corresponding sides and an end spacing between the end rib and the end edge.

3. The airbag cover of claim 2 wherein the side spacing and the end spacing are the same.

4. The airbag cover of claim 2 wherein the side ribs and the end rib meet to form the corner ribs, and the hinge rib extends between the side ribs.

5. The airbag corner of claim 1 wherein the ribs have a lattice arrangement with ribs intersecting and extending substantially parallel to the elongate edge, elongate hinge and the sides of the lower door portion.

6. The airbag cover of claim 1 further comprising another identical pivotal door portion arranged so that respective elongate end edges of the door portions are adjacent to each other and spaced by a narrow gap therebetween, and the upper panel portion is connected to both pivotal door portions by the ribs bonded therebetween with the upper panel portion including a tear line aligned over the gap between the pivotal door portions.

7. The airbag cover of claim 1 in combination with the instrument panel with the upper panel portion being integrated therewith.

* * * * *